(12) United States Patent
Younkins et al.

(10) Patent No.: US 11,560,818 B2
(45) Date of Patent: Jan. 24, 2023

(54) LEAN BURN INTERNAL COMBUSTION ENGINE EXHAUST GAS CONTROL

(71) Applicant: Tula Technology, Inc., San Jose, CA (US)

(72) Inventors: Matthew A. Younkins, San Jose, CA (US); Shikui Kevin Chen, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/459,776

(22) Filed: Aug. 27, 2021

(65) Prior Publication Data

US 2021/0404364 A1    Dec. 30, 2021

Related U.S. Application Data

(63) Continuation-in-part of application No. 17/347,083, filed on Jun. 14, 2021, now Pat. No. 11,333,053,
(Continued)

(51) Int. Cl.
*F01N 3/00* (2006.01)
*F01N 3/20* (2006.01)
(Continued)

(52) U.S. Cl.
CPC ........... *F01N 3/2033* (2013.01); *F01N 3/021* (2013.01); *F01N 3/0814* (2013.01); *F01N 3/2066* (2013.01); *F01N 11/005* (2013.01); *F01N 13/009* (2014.06); *F02D 41/0087* (2013.01); *F02D 41/401* (2013.01); *F01N 2430/08* (2013.01); *F01N 2900/08* (2013.01); *F01N 2900/1404* (2013.01);
(Continued)

(58) Field of Classification Search
CPC ...... F01N 3/2033; F01N 3/021; F01N 13/009; F01N 2430/08; F01N 2900/08; F01N 2900/1404; F01N 2900/1602; F02D 41/0087; F02D 41/401; F02D 2041/0012; F02D 2200/0802
See application file for complete search history.

(56) References Cited

U.S. PATENT DOCUMENTS 4,434,767 A    3/1984    Kohama et al.
4,489,695 A    12/1984    Kohama et al.
(Continued)

FOREIGN PATENT DOCUMENTS

WO    WO2007/100438    9/2007
WO    WO 2010/006311    1/2010
(Continued)

OTHER PUBLICATIONS

International Search Report dated Feb. 23, 2017 from International Application No. PCT/US2016/061139.
(Continued)

*Primary Examiner* — Matthew T Largi
(74) *Attorney, Agent, or Firm* — Beyer Law Group LLP

(57) ABSTRACT

System and methods are described for optimizing exhaust flow rate and temperature during specified operational periods warm-up and keep-warm conditions, by minimizing or maximizing heat flux during those specified operational periods.

15 Claims, 8 Drawing Sheets

Related U.S. Application Data which is a continuation of application No. 16/654,373, filed on Oct. 16, 2019, now Pat. No. 11,060,430, which is a continuation of application No. 16/275,881, filed on Feb. 14, 2019, now Pat. No. 10,494,971, which is a continuation of application No. 15/347,562, filed on Nov. 9, 2016, now Pat. No. 10,247,072.

(60) Provisional application No. 62/254,049, filed on Nov. 11, 2015.

(51) Int. Cl.
*F01N 3/08* (2006.01)
*F02D 41/00* (2006.01)
*F01N 11/00* (2006.01)
*F01N 3/021* (2006.01)
*F02D 41/40* (2006.01)
*F01N 13/00* (2010.01)

(52) U.S. Cl.
CPC .......... *F01N 2900/1602* (2013.01); *F02D 2041/0012* (2013.01); *F02D 2200/0802* (2013.01); *F02D 2200/0804* (2013.01); *Y02T 10/12* (2013.01); *Y02T 10/40* (2013.01)

(56) References Cited

U.S. PATENT DOCUMENTS

| | | | |
|---|---|---|---|
| 4,509,488 A * | 4/1985 | Forster | F02P 9/002 123/481 |
| 4,552,114 A | 11/1985 | Sano et al. | |
| 5,042,928 A | 8/1991 | Richards | |
| 5,377,631 A | 1/1995 | Schechter | |
| 5,410,876 A | 5/1995 | Simko | |
| 5,483,941 A | 1/1996 | Cullen et al. | |
| 5,553,575 A | 9/1996 | Beck et al. | |
| 5,768,887 A | 6/1998 | Nakamura et al. | |
| 5,826,563 A | 10/1998 | Patel et al. | |
| 5,927,075 A | 7/1999 | Khair | |
| 5,945,597 A | 8/1999 | Poublan et al. | |
| 6,158,411 A | 12/2000 | Morikawa | |
| 6,257,207 B1 | 7/2001 | Inui et al. | |
| 6,273,076 B1 | 8/2001 | Beck et al. | |
| 6,314,735 B1 | 11/2001 | Kolmanovsky et al. | |
| 6,405,705 B1 | 6/2002 | Dunsworth | |
| 6,415,601 B1 | 7/2002 | Glugla et al. | |
| 6,619,258 B2 | 9/2003 | McKay et al. | |
| 6,732,506 B2 | 5/2004 | Patterson et al. | |
| 6,769,398 B2 | 8/2004 | Surnilla et al. | |
| 6,978,204 B2 | 12/2005 | Surnilla et al. | |
| 7,032,572 B2 | 4/2006 | Bidner et al. | |
| 7,032,581 B2 | 4/2006 | Gibson et al. | |
| 7,063,062 B2 | 6/2006 | Lewis et al. | |
| 7,066,136 B2 | 6/2006 | Ogiso et al. | |
| 7,069,903 B2 | 7/2006 | Surnilla et al. | |
| 7,069,910 B2 | 7/2006 | Surnilla et al. | |
| 7,086,386 B2 | 8/2006 | Doering | |
| 7,124,717 B2 | 10/2006 | Gaessler et al. | |
| 7,165,391 B2 | 1/2007 | Lewis | |
| 7,165,520 B2 | 1/2007 | Lewis et al. | |
| 7,503,312 B2 | 3/2009 | Surnilla et al. | |
| 7,854,114 B2 | 12/2010 | England | |
| 7,930,087 B2 | 4/2011 | Gibson et al. | |
| 7,931,002 B1 | 4/2011 | Gibson et al. | |
| 8,099,224 B2 | 1/2012 | Tripathi et al. | |
| 8,131,445 B2 * | 3/2012 | Tripathi | F02D 41/1402 701/102 |
| 8,225,771 B2 | 7/2012 | Aso et al. | |
| 8,371,710 B2 | 2/2013 | Gupta et al. | |
| 8,689,541 B2 | 4/2014 | McDonald et al. | |
| 8,886,422 B2 | 11/2014 | Sujan et al. | |
| 8,892,330 B2 | 11/2014 | Yuille et al. | |
| 8,931,255 B2 | 1/2015 | Wilson | |
| 9,086,020 B2 | 7/2015 | Pirjaberi et al. | |
| 9,267,454 B2 | 2/2016 | Wilcutts et al. | |
| 9,399,964 B2 | 7/2016 | Younkins et al. | |
| 9,664,130 B2 | 5/2017 | Wilcutts et al. | |
| 9,726,094 B2 | 8/2017 | Younkins et al. | |
| 9,964,051 B2 | 5/2018 | Pirjaberi et al. | |
| 10,161,325 B2 | 12/2018 | Zur Loye et al. | |
| 10,247,072 B2 | 4/2019 | Younkins et al. | |
| 10,494,971 B2 | 12/2019 | Younkins et al. | |
| 11,060,430 B2 | 7/2021 | Younkins et al. | |
| 2002/0073696 A1 | 6/2002 | Kuenstler et al. | |
| 2002/0116917 A1 | 8/2002 | Glugla et al. | |
| 2003/0010016 A1 | 1/2003 | Beer et al. | |
| 2003/0121249 A1 * | 7/2003 | Foster | F01N 3/0842 60/285 |
| 2003/0131593 A1 * | 7/2003 | Asanuma | F01N 13/009 60/285 |
| 2003/0187565 A1 | 10/2003 | Wong et al. | |
| 2003/0221655 A1 | 12/2003 | Surnilla et al. | |
| 2004/0118116 A1 | 6/2004 | Beck et al. | |
| 2004/0206071 A1 | 10/2004 | Glugla et al. | |
| 2004/0216449 A1 * | 11/2004 | Szymkowicz | F02D 41/0087 60/284 |
| 2004/0237514 A1 | 12/2004 | Surnilla et al. | |
| 2004/0255576 A1 * | 12/2004 | Brown | F02D 17/02 60/284 |
| 2005/0050883 A1 * | 3/2005 | Nishimura | F02D 41/0225 60/286 |
| 2005/0193988 A1 | 9/2005 | Bidner et al. | |
| 2006/0130459 A1 | 6/2006 | Warner et al. | |
| 2007/0051092 A1 | 3/2007 | Pallett et al. | |
| 2007/0051350 A1 | 3/2007 | Pallet et al. | |
| 2009/0301060 A1 | 12/2009 | Kennie et al. | |
| 2010/0006065 A1 | 1/2010 | Tripathi et al. | |
| 2010/0047792 A1 | 2/2010 | Szendro et al. | |
| 2010/0050993 A1 | 3/2010 | Zhao et al. | |
| 2010/0186384 A1 | 7/2010 | Gonze et al. | |
| 2010/0186491 A1 | 7/2010 | Shibata et al. | |
| 2011/0048372 A1 | 3/2011 | Dibble et al. | |
| 2011/0197860 A1 | 8/2011 | Aso et al. | |
| 2011/0253113 A1 | 10/2011 | Roth et al. | |
| 2011/0295489 A1 | 12/2011 | Ma et al. | |
| 2012/0042633 A1 * | 2/2012 | Silvestri | F02D 17/02 60/274 |
| 2012/0046853 A1 | 2/2012 | Silvestri et al. | |
| 2012/0102920 A1 * | 5/2012 | Pipis, Jr. | F01N 3/103 60/297 |
| 2012/0204827 A1 | 8/2012 | Sieber et al. | |
| 2013/0255626 A1 | 10/2013 | Serrano | |
| 2014/0041625 A1 | 2/2014 | Pirjaberi et al. | |
| 2014/0053802 A1 * | 2/2014 | Rayl | F02D 41/0087 123/350 |
| 2016/0115878 A1 | 4/2016 | VanDerWege | |
| 2016/0186672 A1 | 6/2016 | Mehrotra et al. | |
| 2017/0074185 A1 | 3/2017 | Reynolds et al. | |
| 2017/0130630 A1 | 5/2017 | Younkins et al. | |
| 2017/0159581 A1 | 6/2017 | McCarthy, Jr. et al. | |
| 2017/0342920 A1 | 11/2017 | Pirjaberi et al. | |
| 2017/0342922 A1 | 11/2017 | Pirjaberi et al. | |
| 2017/0370308 A1 | 12/2017 | Hashemi et al. | |
| 2018/0179973 A1 | 6/2018 | Tsuroka | |
| 2019/0101041 A1 * | 4/2019 | Willats | F01N 13/148 |
| 2019/0178135 A1 | 6/2019 | Younkins et al. | |
| 2019/0226378 A1 | 7/2019 | Chen et al. | |
| 2020/0025050 A1 | 1/2020 | Chen et al. | |
| 2020/0040788 A1 | 2/2020 | Younkins et al. | |
| 2020/0408126 A1 | 12/2020 | Chen et al. | |

FOREIGN PATENT DOCUMENTS

| | | |
|---|---|---|
| WO | WO 2011/085383 | 7/2011 |
| WO | WO 2015/185519 | 12/2015 |

OTHER PUBLICATIONS

Written Opinion dated Feb. 23, 2017 from International Application No. PCT/US2016/061139.

(56) References Cited

OTHER PUBLICATIONS

International Preliminary Report on Patentability dated May 24, 2018 from International Application No. PCT/US2016/061139.
Chinese Office Action dated Dec. 3, 2020 from Chinese Application No. 201680065398.4.
Indian Office Action dated Dec. 18, 2020 from Indian Application No. 201837015854.
Younkins et al., U.S. Appl. No. 17/347,083, filed Jun. 14, 2021.
Office Action for U.S. Appl. No. 17/561,468 dated Aug. 4, 2022.

* cited by examiner

*Prior Art*

LEAN BURN INTERNAL COMBUSTION ENGINE EXHAUST GAS CONTROL

CROSS REFERENCE TO RELATED APPLICATIONS

This application is a Continuation-in-Part of U.S. application Ser. No. 17/347,083, filed Jun. 14, 2021, which is a Continuation of U.S. application Ser. No. 16/654,373 filed Oct. 16, 2019 (now U.S. Pat. No. 11,060,430 issued Jul. 13, 2021), which is Continuation of U.S. application Ser. No. 16/275,881 filed Feb. 14, 2019 (now U.S. Pat. No. 10,494,971, issued Dec. 3, 2019), which is a Continuation of U.S. application Ser. No. 15/347,562, filed on Nov. 9, 2016 (now U.S. Pat. No. 10,247,072, issued Apr. 2, 2019), which claims priority to U.S. Provisional Application No. 62/254,049, filed on Nov. 11, 2015. All of the above listed applications are incorporated by reference herein in their entirety for all purposes.

FIELD OF THE DESCRIPTION

The present description relates to a skip fire engine control system for an internal combustion engine. More specifically, the present description relates to arrangements and methods for controlling exhaust gas temperature to improve efficacy of an emission control system.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber. The engine must be operated over a wide range of operating speeds and torque output loads to accommodate the needs of everyday driving.

There are two basic types of IC engines; spark ignition engines and compression ignition engines. In the former combustion is initiated by a spark and in the latter by a temperature increase associated with compressing a working chamber charge. Compression ignition engines may be further classified as stratified charge compression ignition engines (e.g., most conventional Diesel engines, and abbreviated as SCCI), premixed charge compression ignition (PCCI), reactivity controlled compression ignition (RCCI), gasoline compression ignition engines (GCI or GCIE), and homogeneous charge compression ignition (HCCI). Some, particularly older, Diesel engines generally do not use a throttle to control air flow into the engine. Spark ignition engines are generally operated with a stoichiometric fuel/air ratio and have their output torque controlled by controlling the mass air charge (MAC) in a working chamber. Mass air charge is generally controlled using a throttle to reduce the intake manifold absolute pressure (MAP). Compression ignition engines typically control the engine output by controlling the amount of fuel injected (hence changing the air/fuel stoichiometry), not air flow through the engine. Engine output torque is reduced by adding less fuel to the air entering the working chamber, i.e. running the engine leaner. For example, a Diesel engine may typically operate with air/fuel ratios of 20 to 55 compared to a stoichiometric air/fuel ratio of approximately 14.5.

Fuel efficiency of internal combustion engines can be substantially improved by varying the engine displacement. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then skipped during the next engine cycle and selectively skipped or fired during the next. In this manner, even finer control of the effective engine displacement is possible. For example, firing every third cylinder in a 4 cylinder engine would provide an effective reduction to $1/3^{rd}$ of the full engine displacement, which is a fractional displacement that is not obtainable by simply deactivating a set of cylinders to create an even firing pattern.

Both spark ignition and compression ignition engines require emission control systems including one or more aftertreatment elements to limit emission of undesirable pollutants that are combustion byproducts. Catalytic converters and particulate filters are two common aftertreatment elements. Spark ignition engines generally use a 3-way catalyst that both oxidizes unburned hydrocarbons and carbon monoxide and reduces nitrous oxides ($NO_x$). These catalysts require that on average the engine combustions be at or near a stoichiometric air/fuel ratio, so that both oxidation and reduction reactions can occur in the catalytic converter. Since compression ignition engines generally run lean, they cannot rely solely on a conventional 3-way catalyst to meet emissions regulations. Instead they use another type of aftertreatment device to reduce $NO_x$ emissions. These aftertreatment devices may use catalysts, lean $NO_x$ traps, and selective catalyst reduction (SCR) to reduce nitrous oxides to molecular nitrogen. The most common SCR system adds a urea/water mixture to the engine exhaust prior to the engine exhaust flowing through a SCR based catalytic converter. In the SCR element the urea breaks down into ammonia, which reacts with nitrous oxides in the SCR to form molecular nitrogen ($N_2$) and water ($H_2O$). Additionally, Diesel engines often require a particulate filter to reduce soot emissions.

To successfully limit engine emissions all aftertreatment system elements need to operate in a certain elevated temperature range to function more efficiently. Since 3-way catalysts are used in spark ignition engines where the engine air flow is controlled, it is relatively easy to maintain a sufficiently elevated engine exhaust temperature, in the range of 400 C, to facilitate efficient pollutant removal in a 3-way catalyst. Maintaining adequate exhaust gas temperature in a lean burn engine is more difficult, since exhaust temperatures are reduced by excess air flowing through the engine. There is a need for improved methods and apparatus capable of controlling the exhaust gas temperature of a lean burn engine over a wide range of engine operating conditions.

SUMMARY

A variety of methods and arrangements for heating or controlling a temperature of an aftertreatment element in an exhaust system of a lean burn internal combustion engine are described. In one aspect, an engine controller includes an aftertreatment element monitor and a firing timing determination unit. The aftertreatment element monitor is arranged to obtain data relating to a temperature of one or more aftertreatment elements, such as a catalytic converter. This data may be in the form of an aftertreatment element temperature model and/or may involve a direct measurement or sensing of the temperature of the aftertreatment element. The firing timing determination unit determines a firing sequence for operating the working chambers of the engine in a skip fire manner. The firing sequence is based at least in part on the aftertreatment element temperature data.

Some implementations involve a skip fire engine control system that dynamically adjusts the firing fraction or firing sequence in response to a variety of conditions and engine parameters, including oxygen sensor data, $NO_x$ sensor data, exhaust gas temperature, barometric pressure, ambient humidity, ambient temperature and/or catalytic converter temperature. In various embodiments, the firing sequence is determined on a firing opportunity by firing opportunity basis.

In another aspect a method of operating a lean burn internal combustion engine having a plurality of working chambers during a cold start is described. The method includes deactivating at least one working chamber such that no air is pumped through the working chamber, obtaining data relating to a temperature of an element in an aftertreatment system, and determining a firing sequence for operating the working chambers of the engine in a skip fire manner. The firing sequence is generated at least in part based on the aftertreatment temperature data.

BRIEF DESCRIPTION OF THE DRAWINGS

The presented technology and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present description relates to a skip fire engine control system for an internal combustion engine—and particularly, lean burn internal combustion engines. More specifically, the present description relates to arrangements and methods for controlling exhaust gas temperature to improve efficacy of an emission control system. In various embodiments, the firing sequence is determined on a firing opportunity by firing opportunity basis or using a sigma delta, or equivalently a delta sigma, converter. Such a skip fire control system may be defined as dynamic skip fire (DSF) control.

Skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. In skip fire operation the firing decisions may be made dynamically; for example, on a firing opportunity by firing opportunity basis although this is not a requirement.

Skip fire engine control can offer various advantages, including substantial improvements in fuel economy for spark ignition engines where pumping losses may be reduced by operating at higher average MAP levels. Since compression ignition engines do not typically run at low manifold pressures, skip fire control does not offer a significant reduction in pumping losses for this type of engine. It does however provide a means to control the engine exhaust gas temperature over a wide range of engine operating conditions. In particular, skip fire control may be used to increase exhaust gas temperature such that it is generally maintained in a range where aftertreatment emission control systems can efficiently reduce tailpipe emissions. Skip fire control can offer a 10% improvement in efficiency in compression ignition engines at light loads; for example, loads under 1 bar BMEP (Brake Mean Effective Pressure).

Figure 1A:
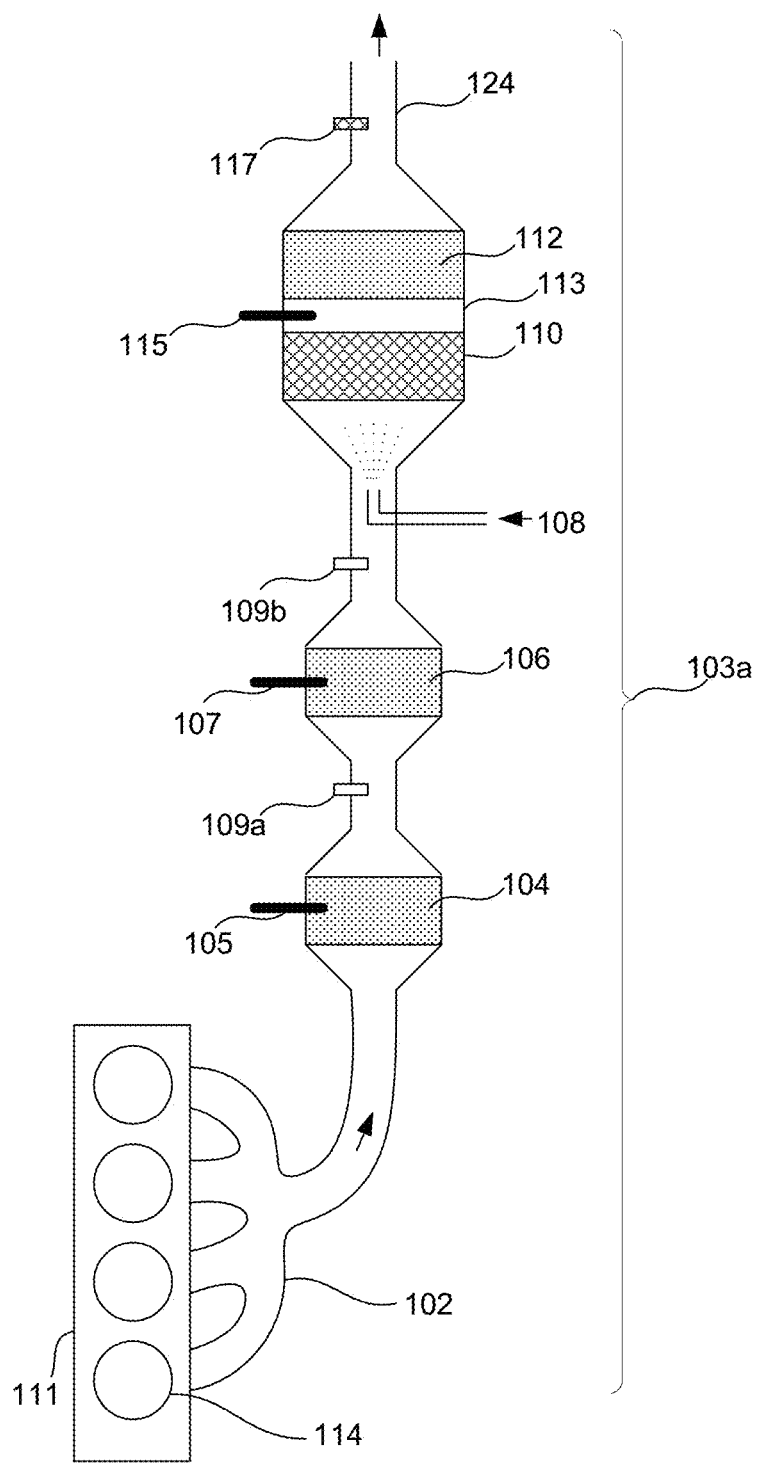
FIG. 1A is a schematic diagram of a representative engine exhaust system for an exemplary compression ignition engine.

FIG. 1A is a schematic diagram of an exemplary lean burn engine and exhaust system. An engine 111 has a number of working chambers or cylinders 114 where combustion occurs. Exhaust gases from the combustion process leave the cylinders 114 by way of an exhaust manifold 102. An exhaust system 103a includes one or more aftertreatment elements to reduce emission of noxious material into the environment. These elements may include a particulate filter 104, an oxidizing catalytic converter 106, a reduction agent injection system 108, and a reducing catalytic converter 113. Collectively these various aftertreatment elements or devices may be referred to as an aftertreatment system. The particulate filter 104 removes particulate matter, i.e. soot, which may be present in the exhaust stream. The oxidizing catalytic converter 106 oxidizes unburned hydrocarbons and carbon monoxide in the exhaust stream. Since the engine 111 is generally operating with a lean air/fuel ratio there is generally adequate oxygen in the exhaust stream to oxidize these incomplete combustion products. The reduction agent injection system 108 introduces a reducing agent, often a mixture of urea and water into the waste stream. The reducing catalytic converter 113 may use selective catalytic reduction (SCR) to reduce nitrous oxides to molecular nitrogen and water. The reducing catalytic converter 113 may use two catalysts. A first catalyst 110 to transform urea in the reducing agent 108 to ammonia and a second catalyst 112 to transform nitrous oxides and ammonia into molecular nitrogen and water. After passing through the reducing catalytic converter 113, the exhaust stream leaves the exhaust system 103a via tailpipe 124 and goes into the environment. The various aftertreatment elements in the exhaust system 103a may sufficiently remove noxious pollutants from the exhaust stream such that it is compatible with current environmental regulations.

The exhaust system 103a may additionally include one or more sensors. For example, oxygen sensors 109a and 109b may be placed before and after the oxidizing catalytic converter 106, respectively. A $NO_x$ sensor 117 may be situated downstream from the reducing catalytic converter 113. One or more temperature sensors may also be incorporated in the exhaust system 103a. Specifically, there may be a temperature sensor 107 to monitor the temperature of oxidizing catalytic converter 106, a temperature sensor 105 to monitor the temperature of the particulate filter 104, and a temperature sensor 115 to monitor the temperature of the reducing catalytic converter 113. Additional sensors (not shown in FIG. 1A or 1B), such as a temperature sensor in the exhaust manifold may be incorporated into the exhaust system.

In order for the aftertreatment elements in an exhaust system to properly function, they need to operate in a certain elevated temperature range. In particular, the catalysts in both the oxidizing catalytic converter 106 and the reducing catalytic converter 113 need to operate over a relatively narrow temperature range. A representative operating range for the reducing catalyst may be between 200 and 400 C, although other catalysts may have different ranges. The oxidizing catalyst may have a broader and somewhat higher operating range. Placement of the oxidizing catalyst upstream from the reducing catalyst results in the oxidizing catalyst being generally exposed to higher temperature exhaust gases, since there is less time for the gases to cool in the exhaust system. Generally, aftertreatment elements in the exhaust system may be arranged such that elements with higher operating temperature ranges are closer to the engine than the other elements. This allows the first aftertreatment element, for example, the particulate filter 104 in FIG. 1A, to experience the highest temperature exhaust stream. The exhaust stream will generally cool as it passes through subsequent elements in the exhaust path unless significant energy is released in any of the aftertreatment devices from exothermic chemical reactions, from an external heat source, oxidization of uncombusted hydrocarbons, or from some other heat source.

The temperature of an aftertreatment element will generally be close to that of the exhaust gas passing through it, although in some cases exothermic chemical reactions facilitated by a catalyst may increase its temperature. Generally exhaust gases will cool as they pass through the exhaust system due to heat transfer from the exhaust system elements and piping into the environment, although continued oxidization of uncombusted or partially combusted fuel may increase the exhaust gas temperature. This oxidation may occur both in the exhaust gas stream or on the oxidizing catalyst. The mass of the aftertreatment system catalysts are also relatively large compared to the mass flow rate of exhaust gases through the catalysts, thus it typically takes several minutes for the catalysts' temperature to equilibrate to that of the exhaust gas flowing through it.

Figure 1B:
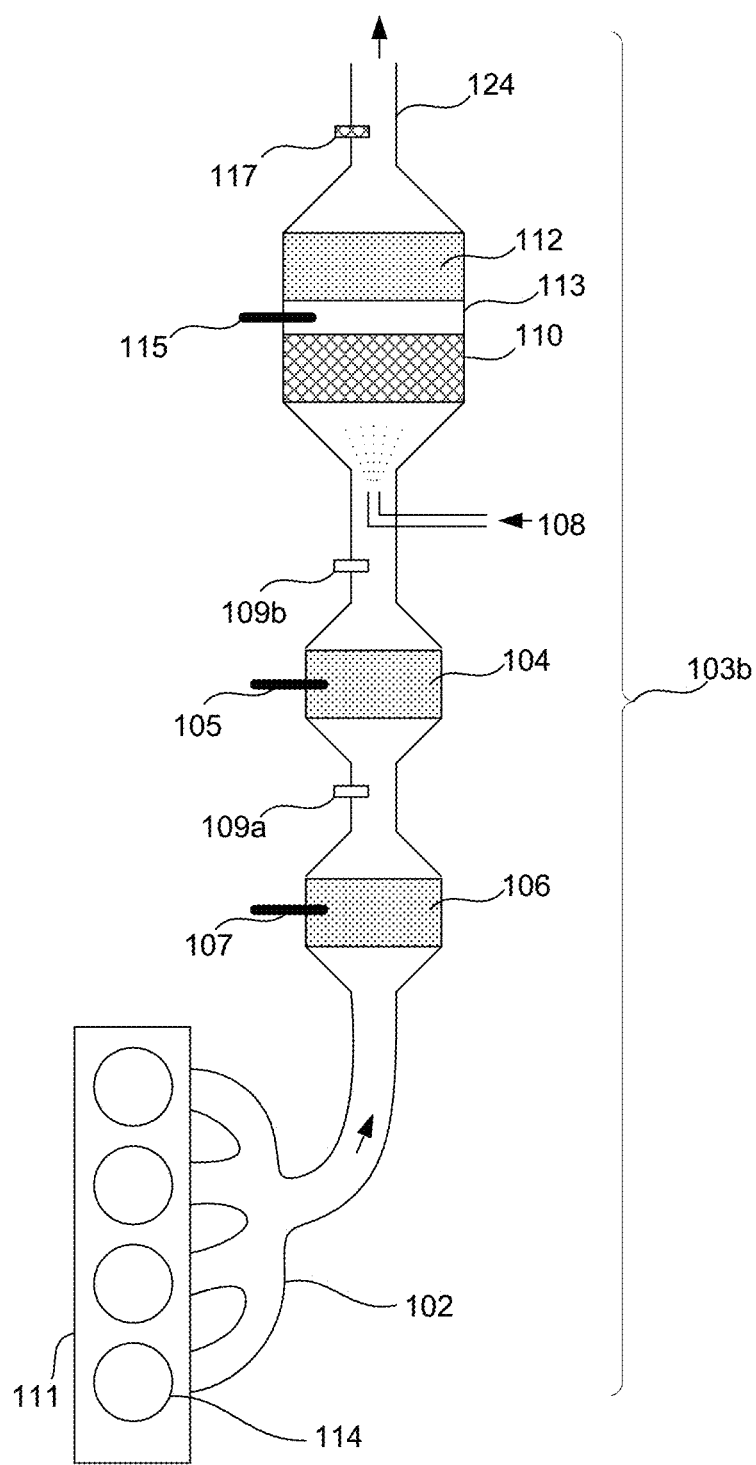
FIG. 1B is a schematic diagram of an alternative representative engine exhaust system for an exemplary compression ignition engine.

It should be appreciated that the order of the elements in the aftertreatment system may be modified. The arrangement shown in FIG. 1A may be appropriate for systems where the particulate filter 104 does not require an active cleaning or regeneration process. FIG. 1B shows an alternative representative exhaust system 103b. A difference between this system and the exhaust system 103a shown in FIG. 1A is the order of the various aftertreatment elements in the exhaust stream. In FIG. 1B the oxidizing catalytic converter 106 is placed upstream of the particulate filter 104. This arrangement may be advantageous when the particulate filter 104 needs to be regularly cleaned by an active process that raises its temperature to around 500 C to 600 C to burn out accumulated soot on the particulate filter 104. The active cleaning process may include introducing uncombusted hydrocarbons into the exhaust stream and converting them into heat by oxidizing them in the oxidizing catalytic converter 106. By positioning the oxidizing catalytic converter 106 upstream from the particulate filter 104, the particulate filter temperature may be actively controlled during the cleaning process. Alternatively, the particulate filter 104 may be situated downstream of the reducing catalytic converter 113. The order of the aftertreatment elements may vary depending on their operating temperature ranges and maximum allowable temperatures.

Various other features and elements not shown in FIGS. 1A and 1B may be incorporated into the exhaust system. Such elements may include, but are not limited to, an exhaust gas recirculation system (EGR), a turbine to power a turbocharger, and a waste gate to control exhaust gas flow through the turbine.

Figure 2:
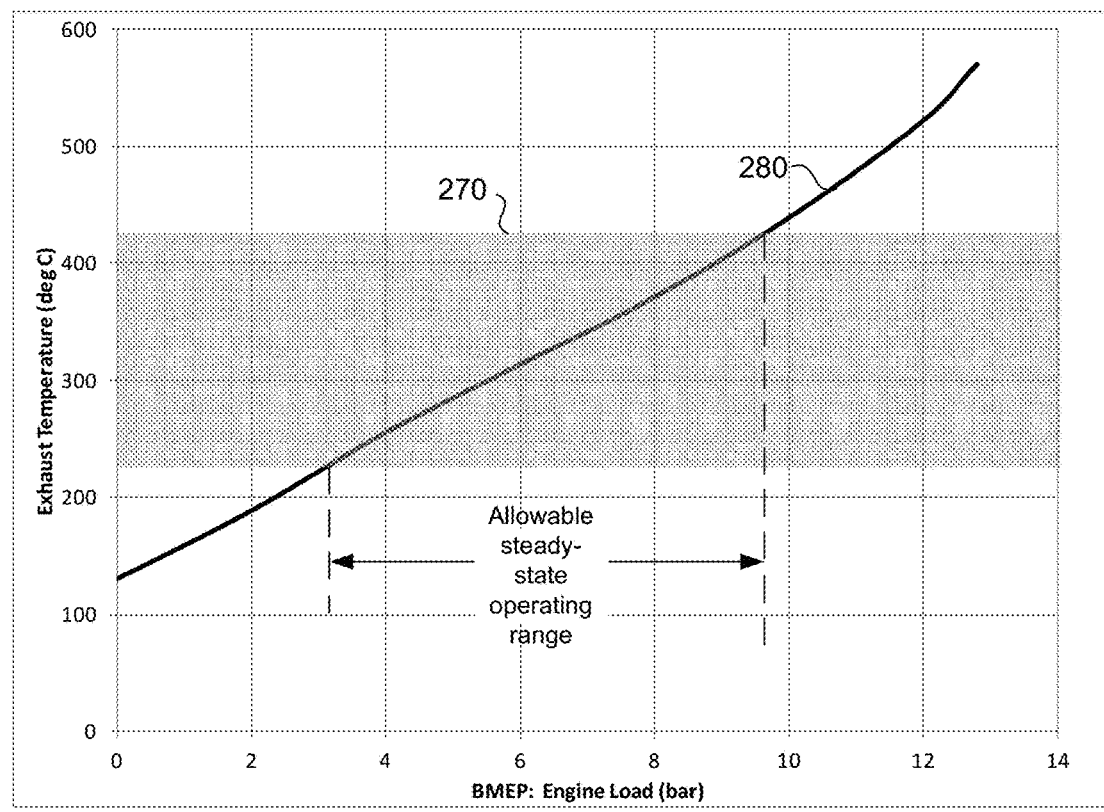
FIG. 2 is a plot of exhaust gas temperature versus engine load for an exemplary compression ignition engine.

FIG. 2 shows exhaust gas temperature at the exhaust manifold (102 in FIGS. 1A and 1B) versus engine operating load for a representative boosted, compression ignition engine operating at 1250 rpm. The curve 280 represents the exhaust gas temperature as a function of engine load expressed in Brake Mean Effective Pressure (BMEP) for a case where all engine cylinders are firing under substantially the same conditions. The engine output is generally controlled by varying the amount of injected fuel, although other engine parameters such as fuel injection timing and exhaust gas recirculation may impact engine output. The highest output load is associated with a stoichiometric air fuel ratio, where substantially all oxygen in the air charge is consumed during combustion. Lower output loads correspond to leaner air/fuel ratios and changing the timing of the fuel injection. Also shown in FIG. 2 as shaded area 270 is an operating temperature range for the engine exhaust temperature that enables efficient aftertreatment operation. The effective temperature range may be limited by the SCR catalyst in the reducing catalytic converter 113, which often has a more limited operating temperature range than oxidizing catalysts and particulate filters. The shaded area 270 depicted in FIG. 2 has an operating range of about 200 C, which is a typical value. The SCR catalyst needs to be maintained within this temperature range for the aftertreatment system to efficiently remove $NO_x$ from the exhaust stream. In some cases if the SCR catalyst is within its operating temperature range, then the other aftertreatment elements are within their respective operating ranges. In this case the temperature operating range of the SCR catalyst represents the temperature operating range of the entire aftertreatment system. If other aftertreatment elements in the exhaust system have different or narrower operating temperature ranges the operating temperature range 270 depicted in FIG. 2 may need to be modified.

It should be appreciated that the operating range 270 depicted in FIG. 2 is not necessarily the operating temperature range of the catalyst, but is the temperature range of exhaust gases in the exhaust manifold that result in the catalyst being in its operating temperature range. For example, the SCR catalyst operating temperature range may be 200 to 400 C and the exhaust gases may cool by 25 C prior to reaching the catalyst. Thus the shaded area 270 represents an exhaust gas temperature range of approximately 225 to 425 C. Different engine operating points and engine designs may have different steady-state offsets between the exhaust gas temperature and temperature of the SCR catalyst or other catalysts in the aftertreatment system. In some cases the exhaust gas temperatures may rise in the exhaust system due to exothermic chemical reactions. The values given above for the catalyst temperature operating range and offset temperature between the catalyst and exhaust manifold gas temperature are representative only and should not be construed as limiting the scope of the present description.

Inspection of FIG. 2 indicates that only over about half of the engine operating range do exhaust gas temperatures fall within an acceptable range for effective $NO_x$ removal. Advantageously, skip fire engine control may be used to control exhaust gas temperature over most of an engine operating load range experienced in a typical driving cycle so that the aftertreatment system temperature remains within its operating temperature window. In particular deactivating one or more cylinders, such that no air is pumped through a cylinder during an operating cycle, increases the average temperature of the exhaust gases exiting the engine. A cylinder may be deactivated by deactivating the cylinder intake(s) valves, the cylinder exhaust valve(s) or both intake and exhaust valves(s). Effectively shutting off a cylinder results in less air to dilute the hot exhaust gases generated by combustion. In particular skip fire control may be used to raise the temperature of the exhaust stream under low load conditions.

Figure 3:
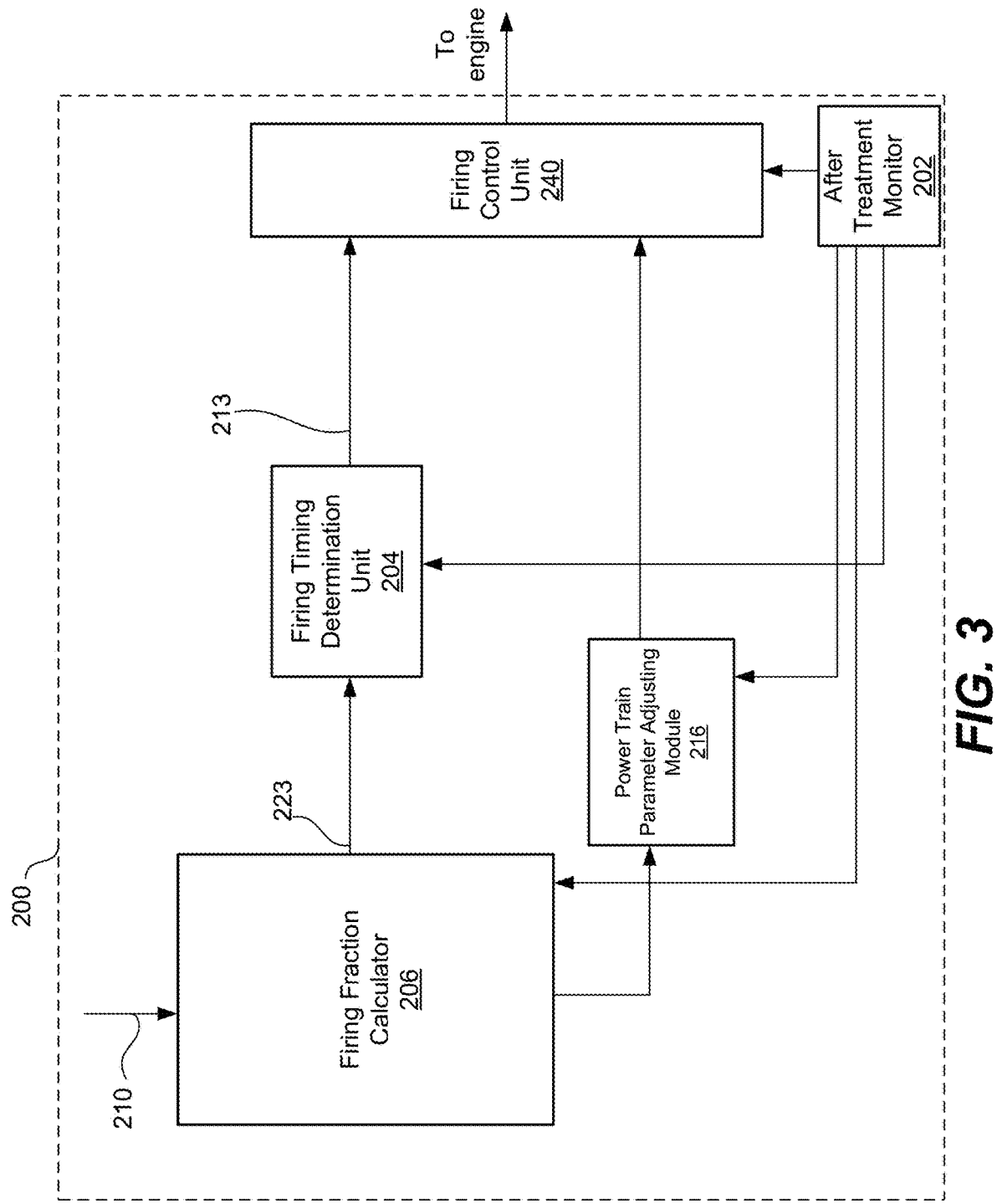
FIG. 3 is a skip fire engine controller according to a particular embodiment of the present description.

Referring initially to FIG. 3, a skip fire engine controller 200 in accordance with one embodiment of the present description will be described. The engine controller 200 includes a firing fraction calculator 206, a firing timing determination unit 204, a power train parameter adjusting module 216, a firing control unit 240 and an aftertreatment monitor 202. The firing control unit 240 receives input from the firing timing determination unit 204, the aftertreatment monitor 202, and the power train parameter adjusting module 216 and manages operation of the working chambers of an engine based on that input.

The aftertreatment monitor 202 represents any suitable module, mechanism and/or sensor(s) that obtain data relating to a temperature of an aftertreatment element. It may correspond to the temperature of reducing catalytic converter 113, oxidizing catalytic converter 106, or particulate filter 104 (see in FIGS. 1A and 1B). If the reducing catalytic converter has the narrowest operating range of any aftertreatment element, only data representative of its temperature may be used. In various embodiments, for example, the aftertreatment monitor 202 may include oxygen sensor data from oxygen sensors 109a and/or 109b. Aftertreatment monitor may also include measurements from $NO_x$ sensors placed before and after the reducing catalytic converter 113. Aftertreatment monitor 202 may also include such inputs as ambient air temperature, exhaust gas temperature in the exhaust manifold, barometric pressure, ambient humidity and/or engine coolant temperature. Temperature data may be obtained using one or more sensors, such as temperature sensors 105, 107 and 115. In some embodiments, the engine controller 200 and the aftertreatment monitor 202 do not require a direct measurement or sensing of the temperature of an aftertreatment element. Instead, an algorithm using one or more inputs, such as a catalytic converter temperature model, may be used to determine the aftertreatment element or system temperature. The model is based on one or more of the above parameters (e.g., oxygen sensor data, $NO_x$ sensor data, exhaust gas temperature, ambient temperature, barometric pressure, ambient humidity, etc.) that are representative or related to a catalytic converter temperature. In some embodiments a combination of a temperature model may be combined with measured temperature values to determine the temperature data. In particular, the model may be used to predict aftertreatment element temperature in transient situations, like engine startup or transitions between engine loads. A feed forward based control system may be used to control the temperature of an aftertreatment element in such cases. In still other embodiments, the aftertreatment monitor 202 directly estimates or senses the catalytic converter temperatures or temperatures of other elements in the aftertreatment system. The aftertreatment monitor 202 transmits the aftertreatment system temperature data to the power train parameter adjusting module 216, the firing timing determination unit 204, the firing control unit 240 and/or the firing fraction calculator 206.

In addition to the aftertreatment monitor temperature data, the firing fraction calculator 206 receives input signal 210 that is indicative of a desired torque or other control signal. The signal 210 may be received or derived from an accelerator pedal position sensor (APP) or other suitable sources, such as a cruise controller, a torque controller, etc.

Based on the above inputs, the firing fraction calculator 206 is arranged to determine a skip fire firing fraction (i.e., commanded firing fraction 223). The firing fraction is indicative of the percentage of firings under the current (or directed) operating conditions that are required to deliver the desired output and aftertreatment element temperature. Under some conditions, the firing fraction may be determined based on the percentage of optimized firings that are required to deliver the desired output and aftertreatment element temperature (e.g., when the working chambers are firing at an operating point substantially optimized for fuel efficiency). It should be appreciated that a firing fraction may be conveyed or represented in a wide variety of ways. For example, the firing fraction may take the form of a firing pattern, sequence or any other firing characteristic that involves or inherently conveys the aforementioned percentage of firings.

The firing fraction calculator 206 takes into account a wide variety of parameters that might affect or help indicate the aftertreatment element temperature. That is, the firing fraction is determined at least partly based on the aftertreatment element temperature data received from the aftertreatment monitor 202. In some approaches, the firing fraction is based on direct measurement of the aftertreatment element. Additionally, other information may be used to determine the firing fraction, for example, oxygen sensor data, $NO_x$ sensor data, ambient air temperature, exhaust gas temperature, catalyst temperature, barometric pressure, ambient humidity, engine coolant temperature, etc. In various embodiments, as these parameters change with the passage of time, the firing fraction may be dynamically adjusted in response to the changes.

The method used to generate the firing fraction may vary widely, depending on the needs of a particular application. In one particular approach, the firing fraction is generated at least partly as a function of time. That is, a preliminary firing fraction value is generated that is adjusted in a predetermined manner depending on the amount of time that has passed since engine startup. The preliminary value may then be adjusted further using an algorithm based on any of the above parameters, such as ambient air temperature, exhaust gas temperature, catalyst temperature, $NO_x$ sensor data, and/or oxygen sensor data. In various embodiments, some firing fractions are known to cause undesirable noise, vibration and harshness (NVH) in particular vehicle or engine designs, and such firing fractions may be adjusted or avoided. In still other embodiments, a firing fraction is selected based on aftertreatment element temperature data from a predefined library of firing fractions that have acceptable NVH characteristics. The aftertreatment element temperature data may be obtained from an aftertreatment element temperature model or may be a sensed aftertreatment element temperature.

In the illustrated embodiment, a power train parameter adjusting module 216 is provided that cooperates with the firing fraction calculator 206. The power train parameter adjusting module 216 directs the firing control unit 240 to set selected power train parameters appropriately to insure that the actual engine output substantially equals the requested engine output at the commanded firing fraction. By way of example, the power train parameter adjusting module 216 may be responsible for determining the desired fueling level, number of fuel injection events, fueling injection timing, exhaust gas recirculation (EGR), and/or other engine settings that are desirable to help ensure that the actual engine output matches the requested engine output. Of course, in other embodiments, the power train parameter adjusting module 216 may be arranged to directly control various engine settings.

In some implementations of the present description, the power train parameter adjusting module 216 is arranged to shift skipped working chambers between different modes of operation. As previously noted, skip fire engine operation involves firing one or more selected working cycles of selected working chambers and skipping others. In a first mode of operation, the skipped working chambers are deactivated during skipped working cycles—i.e., for the duration of the corresponding working cycle, very little or no air is passed through the corresponding working chamber. This mode is achieved by deactivating the intake and/or exhaust valves that allow air ingress and egress into the working chamber. If both intake and exhaust valves are closed, gases are trapped in the working chamber effectively forming a pneumatic spring.

In a second mode of operation, the intake and exhaust valves for the skipped working chamber are not sealed during the corresponding working cycle and air is allowed to flow through the working chamber. In this mode of operation no combustion takes place in the skipped working chamber and the air pumped through the skipped working chamber is delivered to the exhaust system. This has the effect of diluting the exhaust stream and lowering its temperature. It also introduces excess oxygen into the exhaust stream.

In a third mode of operation, the intake and exhaust valves of a skipped working chamber open and fuel is injected into the cylinder late in the power stroke. The result is uncombusted or only slightly combusted fuel in the exhaust stream delivered by the skipped working chambers. The uncombusted hydrocarbons enter the oxidizing catalytic converter and react exothermically with the air from the skipped working chambers. This reaction helps to heat the oxidizing catalytic converter. Such an approach can be particularly useful during an engine start-up period in which the oxidizing catalytic converter needs to be rapidly heated in order to minimize the emission of pollutants. In other embodiments, the uncombusted hydrocarbons may be useful to clean a particulate filter 104 by raising its temperature to burn off accumulated soot. While deliberating introducing hydrocarbons into the exhaust system may be useful in some situations, this practice should be generally avoided or minimized, since it reduces fuel economy.

It should be appreciated that the skipped cylinders can be operated in any of the three modes of operation, i.e. deactivated, operating valves without fuel injection, or injecting fuel in a manner that results in little or no combustion. That is on some working cycles a skipped cylinder may be operated with disabled valves and on a subsequent cycle with operating valves and on a following cycle with disabled valves. Whether a cylinder is skipped or fired is also controlled in a dynamic manner. This level of control allows optimization of the amount of air, oxygen, and uncombusted fuel delivered into the exhaust system by the skipped cylinders. The fired cylinders generally produce hot exhaust gases containing some residual oxygen, since the cylinders are generally running lean, as well as some residual level of unburned hydrocarbons.

Controlling emissions during engine start-up is technically challenging because the various aftertreatment elements have not reached their operating temperatures. Initially from a cold start all engine and exhaust components are cold. It may be desirable to start the engine at a relatively low firing fraction, with firing cylinders at a nominally stoichiometric air/fuel ratio, and keep all the skipped cylinders in mode one to avoid pumping any air into the oxidizing catalytic converter. Once the oxidizing catalytic converter temperature has started to rise, oxygen may be delivered to the catalytic converter by operating at least some of the skipped cylinders in the second or third mode. Unburned hydrocarbons may simultaneously be delivered to the oxidizing catalytic converter by running the firing cylinders at a rich air/fuel ratio or via late fuel injection through the skipped cylinders, i.e. mode three operation. The oxygen and unburned hydrocarbons may then exothermically react in the oxidizing catalyst converter to more rapidly increase its temperature. This reaction may occur only once the oxidizing catalyst converter is at or above hydrocarbon light-off temperature and thus it may be desirable to only introduce oxygen and unburned hydrocarbons to the catalytic converter once it has reached that temperature. Once the oxidizing catalytic converter has reached its operational temperature all the skipped cylinders may be operated in mode three, late fuel injection through the skipped cylinders, to raise the exhaust gas temperature. It should be appreciated that heating the oxidizing catalyst by supplying it with unburned fuel and oxygen will also heat other aftertreatment elements downstream in the exhaust system from the oxidizing catalyst. These aftertreatment elements may include the reducing catalyst and/or particulate filter.

In various implementations, the power train parameter adjusting module 216 is arranged to cause the engine to shift between the three modes of operation based on the aftertreatment element temperature data and/or other engine operating parameters. For example, in some approaches, if the engine controller determines that the temperature of the aftertreatment element is below its effective operating temperature range, but above the light-off temperature, (e.g., during a cold start or under extended low load conditions), the power train parameter adjusting module may utilize the third mode of operation (e.g., a skip fire engine operation that involves the delivery of unburned hydrocarbons to the oxidizing catalytic converter). This mode of operation can help expedite the heating of the oxidizing catalyst to a desired operating temperature. If, however, the engine controller determines that the temperature of the oxidizing catalyst is high enough or has reached an effective operating temperature range temperature, the power train parameter adjusting module will shift to the first mode of operation (e.g., skip fire engine operation involving delivery of a lean air fuel mixture to the fired working chambers and deactivation of the skipped working chambers.)

There also may be situations in which the catalyst temperature is too high and cooling is required. For example, compression ignition engines are typically coupled with an aftertreatment emission control element that operates in a somewhat narrower band of operating temperatures than spark ignition engines. In some cases, the temperature of the aftertreatment element may exceed this band. It is desirable to avoid such situations, since excessive temperatures can damage or impair the performance of the aftertreatment element. Accordingly, in some embodiments, the engine controller makes a determination as to whether the aftertreatment element has exceeded a particular threshold temperature. If that is the case outside air may be injected into the exhaust system prior to any aftertreatment element whose temperature exceeds its operational temperature range. The extra air that flows through the exhaust system will help cool the aftertreatment emission control element. Once the engine controller determines that the temperature of the aftertreatment element is within a desired operating temperature band, the outside air injection may be terminated.

It should be appreciated that in some embodiments, different modes may be applied to different working cycles. In other words, during a selected working cycle of a particular working chamber, the working chamber may be operated in a second mode while in the very next working cycle, the corresponding working chamber will be operated in a first mode. In other words, in one working cycle, the skipped working chamber may allow for the passage of air, while in the very next firing opportunity that involves a skipped working chamber, the working chamber is deactivated and sealed. Changes in the delivery of air-fuel mixtures and the operation of the working chamber valves can change dynamically from one working cycle to the next and from one working chamber to the next in response to the exhaust system temperature data and/or a variety of engine operating parameters.

The firing timing determination unit 204 receives input from the firing fraction calculator 206 and/or the power train parameter adjusting module 216 and is arranged to issue a sequence of firing commands (e.g., drive pulse signal 213) that cause the engine to deliver the percentage of firings dictated by the commanded firing fraction 223. The firing timing determination unit 204 may take a wide variety of different forms. For example, in some embodiments, the firing timing determination unit 204 may utilize various types of lookup tables to implement the desired control algorithms. In other embodiments, a sigma delta converter or other mechanisms are used. The sequence of firing commands (sometimes referred to as a drive pulse signal 213) outputted by the firing timing determination unit 204 may be passed to a firing control unit 240 which orchestrates the actual firings.

Some implementations involve selective firing of particular working chambers and not others. For example, during an engine startup period from a cold start, the engine controller may fire only a particular subset of working chambers that are physically closer to an aftertreatment element in the exhaust system, i.e have a shorter exhaust stream path to the aftertreatment element. Since exhaust from those working chambers has a shorter path to travel, the exhaust loses less thermal energy and can help heat the aftertreatment elements more quickly and efficiently. At least one working chamber may be deactivated such that no air is pumped through the working chamber raising the temperature of the exhaust gases for a number of working cycles. This at least one deactivated working chamber may be the working chamber positioned farthest from the aftertreatment elements being heated.

The engine controller 200, firing fraction calculator 206, the power train parameter adjusting module 216, and the firing timing determination unit 204 may take a wide variety of different forms and functionalities. For example, the various modules illustrated in FIG. 3 may be incorporated into fewer components or have their features performed by a larger number of modules. Additional features and modules may be added to the engine controller. By way of example, some suitable firing fraction calculators, firing timing determination units, power train parameter adjusting modules and other associated modules are described in co-assigned U.S. Pat. Nos. 7,954,474; 7,886,715; 7,849,835; 7,577,511; 8,099,224; 8,131,445; 8,131,447; 9,086,020; and 9,120,478: U.S. patent application Ser. Nos. 13/774,134; 13/963,686; 13/953,615; 13/886,107; 13/963,759; 13/963,819; 13/961,701; 13/843,567; 13/794,157; 13/842,234; 13/004,839, 13/654,244 and 13/004,844, each of which is incorporated herein by reference in its entirety for all purposes. Any of the features, modules and operations described in the above patent documents may be added to the controller 200. In various alternative implementations, these functional blocks may be accomplished algorithmically using a microprocessor, ECU or other computation device, using analog or digital components, using programmable logic, using combinations of the foregoing and/or in any other suitable manner.

Figure 4:
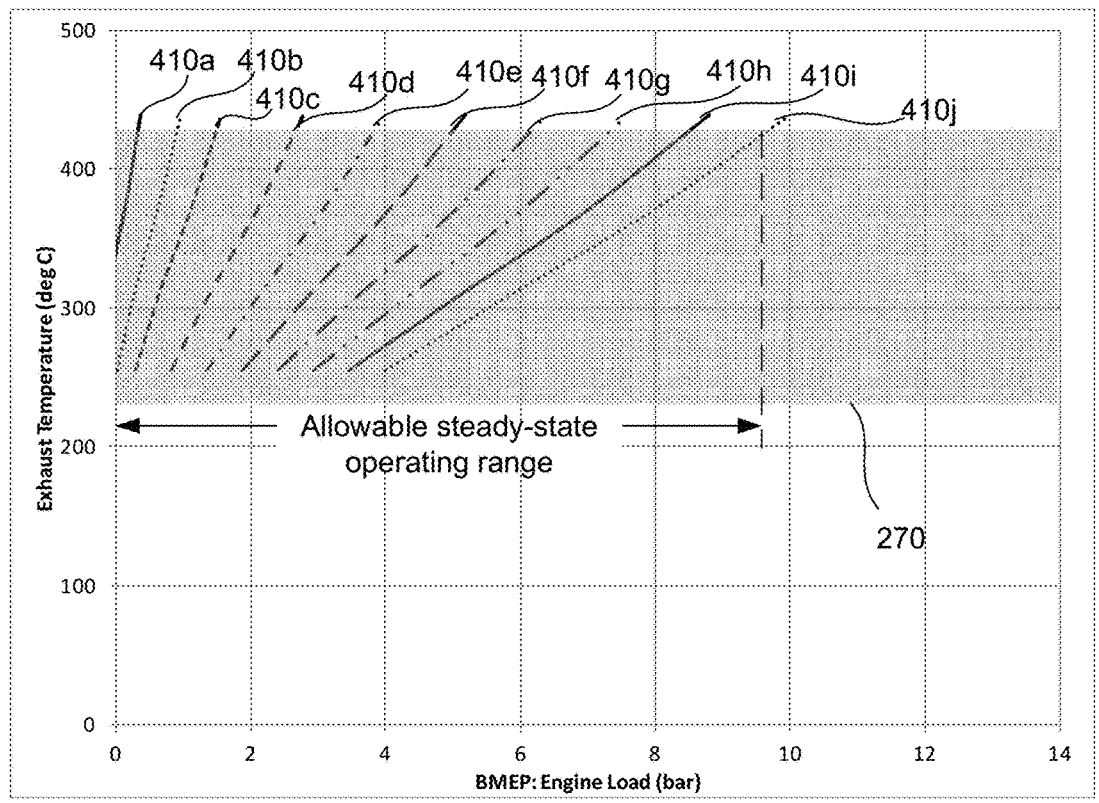
FIG. 4 is a plot of exhaust gas temperature versus engine load for an exemplary compression ignition engine operating under skip fire control with skipped cylinders being deactivated.

FIG. 4 shows exhaust manifold gas temperature versus engine operating load for a representative boosted, compression ignition engine operating at 1250 rpm with skip fire control. The engine operating load is expressed in BMEP relative to the total engine displacement with all cylinders operating. A plurality of operating curves 410a thru 410j are shown in FIG. 4. These correspond to operating the engine with different firing fractions with deactivated cylinders, operational mode one described above. The left most curve 410a corresponds to the lowest firing fraction and the right most curve 410j corresponds to the highest firing fraction, i.e. a firing fraction of 1, all cylinders firing. Intermediate curves 410b thru 410i correspond to successive higher firing fractions. Curve 410j, corresponding to a firing fraction of one, is identical to the corresponding portion of curve 280 shown in FIG. 2. The firing fractions chosen may correspond to firing fractions providing acceptable NVH (noise, vibration, and harshness) characteristics as described in co-assigned U.S. Pat. No. 9,086,020 and pending U.S. patent application Ser. Nos. 13/963,686 and 14/638,908. Also shown in FIG. 4 is the shaded region 270 which depicts the exhaust manifold gas temperature required to elevate an aftertreatment element in the exhaust system into its operational temperature range. This region is identical to the shaded region 270 shown in FIG. 2.

Within the allowed operating region the required engine output can be generated by operating on one of the firing fractions denoted in curves 410*a* thru 410*j* while maintaining the engine exhaust gas temperature within the required temperature limits. In some cases several firing fractions may deliver acceptable engine output and exhaust gas temperature. In these cases the firing fraction providing the most fuel efficient operation may be selected by the firing fraction calculator 206 (FIG. 3) to operate the engine. Inspection of FIG. 4 shows that the allowed steady-state operating range using skip fire control is much larger than the corresponding range without such control as shown in FIG. 2. Similar operating curves 410*a* thru 410*j* and exhaust manifold gas temperature ranges 470 can be generated for other engine speeds. Generally operation in skip fire control with varying firing fractions will allow steady-state operation over a wide range of engine loads.

As shown in FIG. 4 there is a range of high load conditions, above approximately 9.5 bar BMEP, where the engine cannot operate in steady-state and maintain the element in the aftertreatment system in its desired temperature range. These high loads require operation on all cylinders and thus no cylinders are skipped, i.e. a firing fraction of one. Under these conditions the aftertreatment system temperature may be reduced by injecting outside air into the exhaust system as previously described. Also, under typical driving cycles an engine seldom operates in this high load region over extended periods of time. Operation for a short time period in this high load regime, such as when passing or going up a steep hill, will generally not result in the aftertreatment system exceeding its operating temperature range due to the thermal inertia of the aftertreatment system. In these cases no outside cooling need be applied to the aftertreatment system, since it will not exceed its operating temperature range.

Operation of a compression ignition internal combustion with skip fire control and deactivating the skipped cylinders allows maintaining a high exhaust gas temperature over a large engine operating range. High exhaust gas temperatures are generally advantageous for a particulate filter (104 in FIGS. 1A and 1B), which may be part of an aftertreatment system. Maintaining the particulate filter 104 at a high temperature will encourage oxidization of soot particles trapped in the filter.

Some particulate filters 104 require their temperature to be raised, periodically, to around 500 C to 600 C to remove accumulated soot on the filter in order for the filter to function again. This active temperature management process is very fuel consuming. Even though the clean-out/regeneration process has to occur every 200 to 400 miles, depending on size of filter, the overall penalty on fuel economy can be significant. Skip fire operation may reduce or eliminate the need for regeneration where the particulate filter 104 is heated to fully oxidize soot trapped in the filter thus cleaning the filter. With skip fire operation the particulate filter can generally operate at a higher temperature, which reduces the soot build up rate lengthening the period between cleaning cycles. In some cases, skip fire control may be used to temporarily deliberately raise the exhaust stream temperature to clean the particulate filter 104 in an active regeneration process. Such a cleaning method will be more fuel efficient than cleaning methods that rely on introducing uncombusted hydrocarbons into the exhaust stream.

Figure 5:
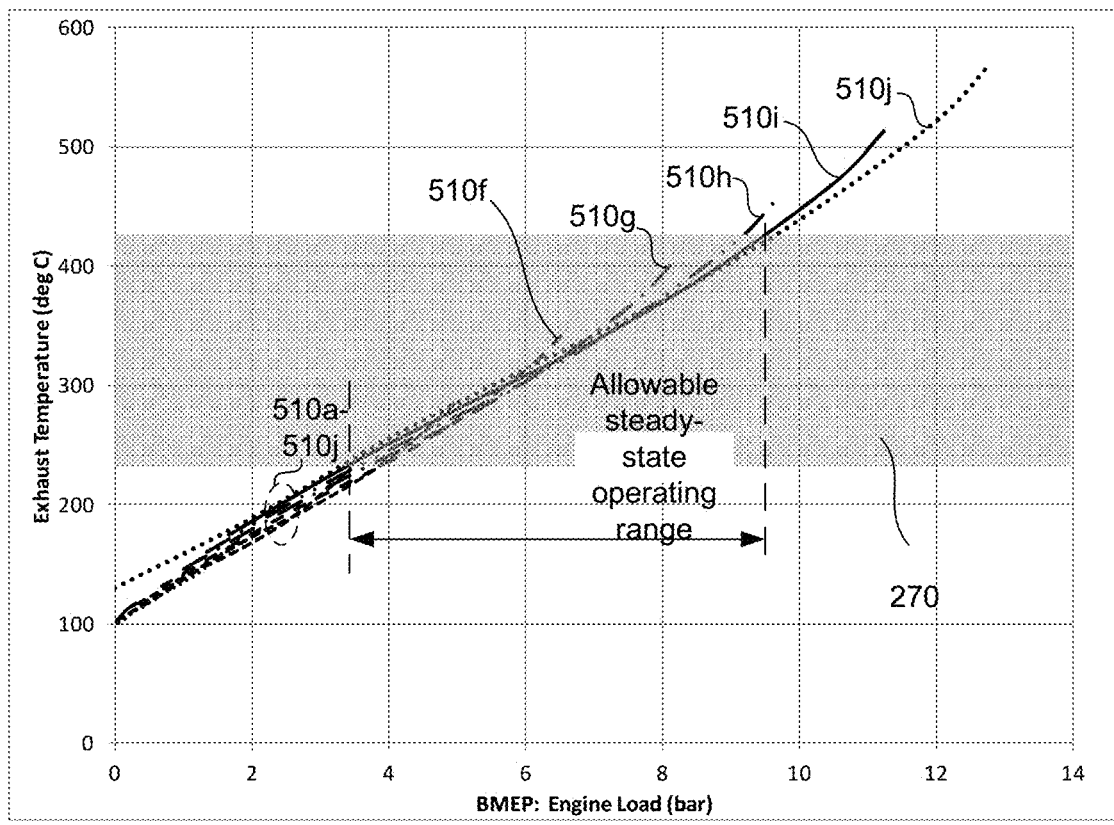
FIG. 5 is a plot of exhaust gas temperature versus engine load for an exemplary compression ignition engine operating under skip fire control with skipped cylinders pumping air.

FIG. 5 shows exhaust manifold gas temperature versus engine operating load for a representative boosted, compression ignition engine operating at 1250 rpm with skip fire control. FIG. 5 is similar to FIG. 4 except the skipped cylinders are not deactivated, they are pumping air without any added fuel (mode 2). The various curves 510*a*-510*j* represent operation at different firing fractions. The numeric designators 510*a* thru 510*j* represent the same firing fractions as shown in FIG. 4. Curve 510*j*, which corresponds to operation with a firing fraction of one, is identical to curve 410*j* and curve 280. This is operational mode two as described above. Shaded region 270 is identical to that shown in FIG. 2 and FIG. 4 and represents the exhaust gas temperature required to heat an element in the aftertreatment system into its operational temperature range. Inspection of FIG. 5 shows that operation in mode two without adding fuel to the skipped cylinders does little to expand the range of allowable steady-state operating conditions relative to all cylinders firing (shown in FIG. 2). Operation of some skipped cylinders in mode 2, pumping, and some skipped cylinders in mode 1, deactivated, may be useful to control exhaust gas temperature in some cases.

Two operating areas where skip fire control is particularly useful are during start-up and at light loads where a compression ignition engine usually runs very lean. This is because the fuel flow is very low as result of the light load. In most older compression ignition engines the air flow cannot be further reduced since these engines generally have no throttle. Therefore, the exhaust temperature can sometimes be too low for effective $NO_x$ conversion in the catalyst. Some prior art solution have used hydrocarbon injection into the exhaust system to generate additional heat in the exhaust system maintaining one or more aftertreatment elements in their desired operational temperature range. This control method sacrifices fuel economy. Use of skip fire control may obviate—or at least significantly reduce—the need for this hydrocarbon injection.

Figure 6:
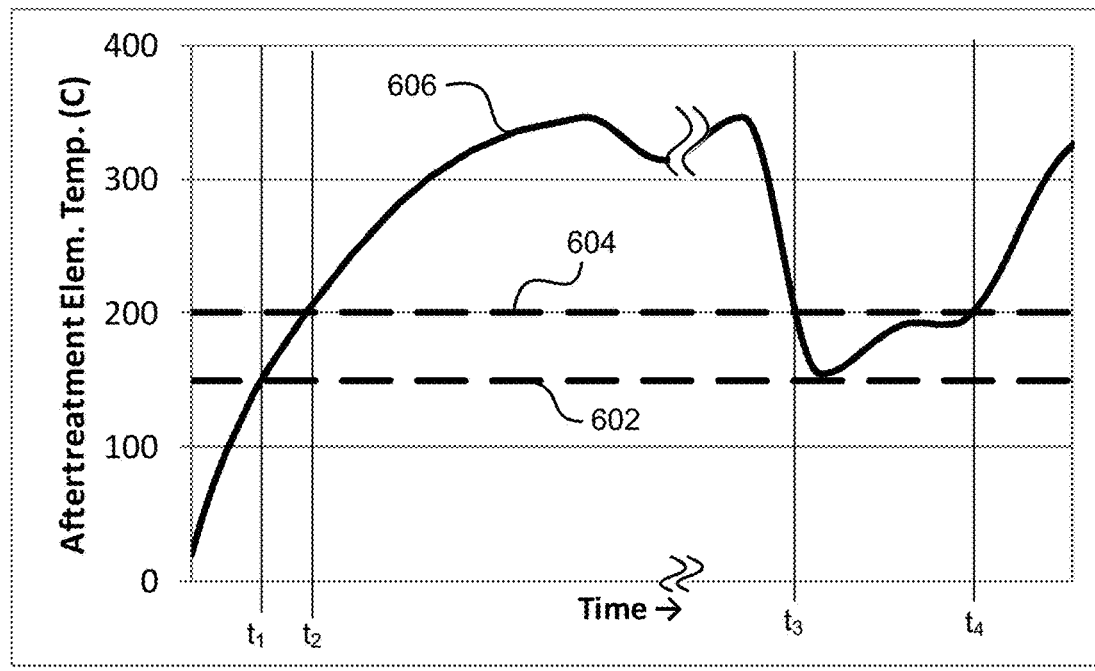
FIG. 6 is a prior art representative plot of an aftertreatment element temperature during a cold start-up and over a portion of a drive cycle.

FIG. 6 shows the temperature of an aftertreatment element 606 over cold start-up and a portion of a drive cycle of a prior art compression ignition engine. The figure also shows the light-off temperature 602, the temperature at which some hydrocarbons in the exhaust stream will self-ignite, and the lower boundary of the effective operating range of the aftertreatment element 604. In this figure the light-off temperature is shown as 150 C and the lower aftertreatment operating range as 200 C; however, these should be treated as only representative values and in practice they may be larger or smaller.

The drive cycle begins with the aftertreatment element at ambient temperature, assumed to be 20 C. The aftertreatment element reaches light-off temperature at time $t_1$. It is only after this time that injecting hydrocarbons into the exhaust stream can raise the temperature of an aftertreatment element. The aftertreatment element temperature continues to rise until time $t_2$ where it reaches its effective operating range. Prior to time $t_2$ the aftertreatment element is ineffective at removing pollutants from the exhaust stream. The aftertreatment element remains effective at removing pollutants until time $t_3$, which represents an extended low load portion of the drive cycle. For the period between $t_3$ and $t_4$ the aftertreatment element is below its operating range and is ineffective at removing pollutants.

Figure 7:
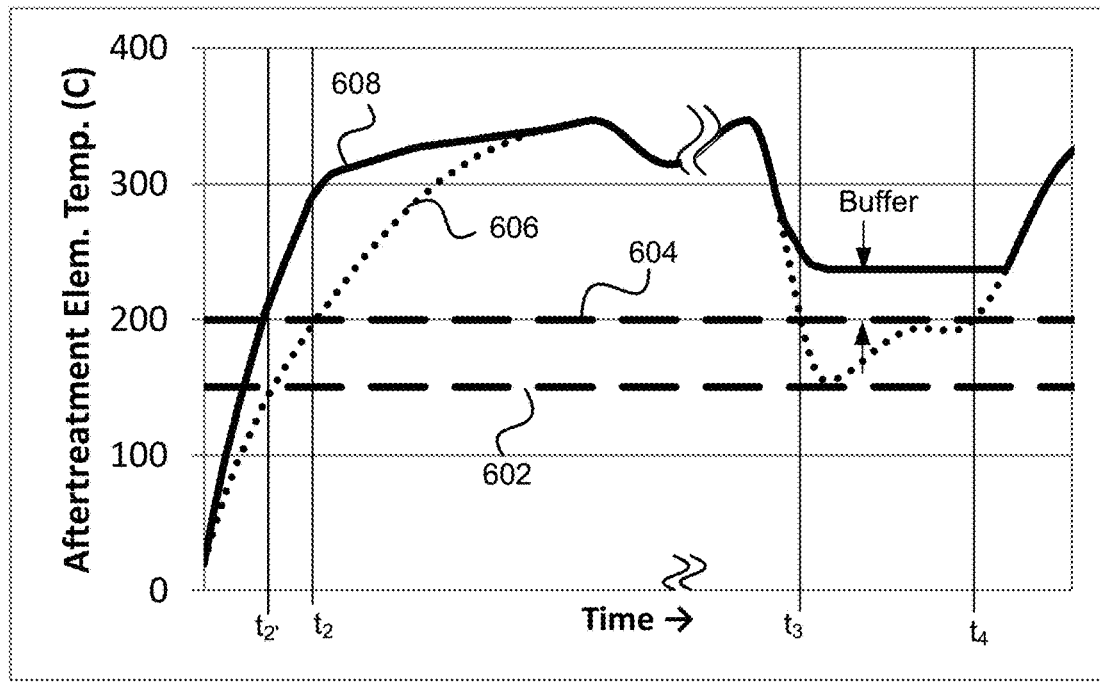
FIG. 7 is a representative plot of an aftertreatment element temperature during a cold start-up and over a portion of a drive cycle using skip fire control.

To reduce emissions, it is desirable to reduce the start-up time until the aftertreatment element reaches its operating temperature and reduce or eliminate the aftertreatment element falling below its operating temperature during low load conditions. FIG. 7 shows a representative drive cycle using the current description. The prior art aftertreatment element temperature is shown as the dotted line 606, which is identical to the aftertreatment temperature shown in FIG. 6. The light-off temperature 602 and lower limit of the aftertreatment element operating temperature 604 are as in FIG. 6. Curve 608 depicts the aftertreatment element temperature. The time for the aftertreatment element to reach its operating temperature has been reduced from $t_2$ to $t_{2'}$. Also, the aftertreatment element is maintained within its effective operating range in the extended low load period between $t_3$ and $t_4$. The engine controller may maintain the aftertreatment element temperature somewhat above its minimum operating temperature range to maintain a buffer above this value. Maintaining a buffer helps to prevent the aftertreatment element temperature from falling below its operating range should the engine load be further reduced. Engine emissions over the drive cycle are thus lower when using the current description shown in FIG. 7 as compared to the prior art shown in FIG. 6.

Various components and/or operating parameters of the engine and exhaust system may be configured for optimizing the exhaust flow rate and temperature during specified operational periods, e.g. when the engine is in a warm-up period (i.e. operating from a cold start) or keep-warm period (i.e. during deceleration or extended idle). According to one embodiment, the technology of the present description may incorporate systems and methods for exhaust flow/temperature optimization as provided in FIG. 8 and FIG. 9.

During engine warm-up, where it is desirable to have a fast warm-up to increase catalyst temperature as quickly as possible, heat flux is ideally maximized. Accordingly, increasing exhaust temperature alone may not ensure fastest warm-up. Instead, maximizing heat flux by optimizing exhaust temperature and exhaust flow rate together is key. For operations and engines using dynamic skip fire (DSF), increasing exhaust temperature is generally associated with reduced exhaust flow rate. As a result, exhaust gas enthalpy may not be ideal. Therefore, it is important for the DSF/controller algorithm to select a firing fraction (FF) density, along with other parameters such as EGR rate, intake manifold boost pressure, etc., that maximize enthalpy, not just exhaust temperature during warm-up period.

During keep-warm periods, heat is generally dissipated from catalyst to exhaust gas. To retain heat and maintain temperature in the catalyst, heat flux is ideally minimized One vehicle operation that lessens heat flux is all-cylinder cut off (such as DCCO). However, for lean-burn or diesel engine application with a turbocharger system, cylinder cut off may be not viable because of minimum turbine speed requirements in some operating conditions. Therefore, it is important to select an induction ratio (either with fueling/firing or without fueling or combination of both) to optimize exhaust temperature and exhaust flow rate so that heat flux is minimized.

Figure 8:
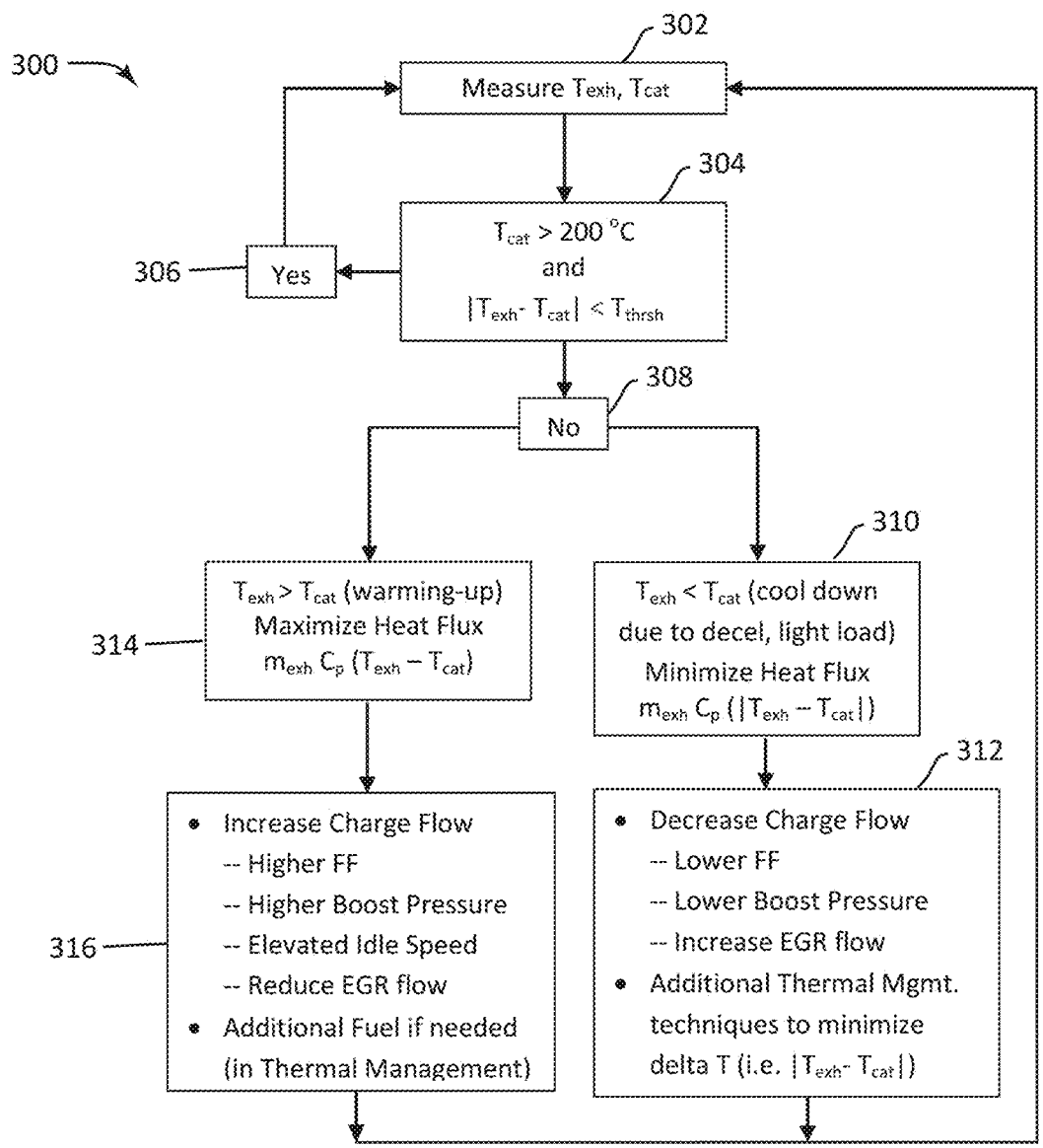
FIG. 8 is a schematic flow diagram of a representative process for optimizing exhaust flow rate and temperature during warm-up and keep-warm periods.
Figure 9:
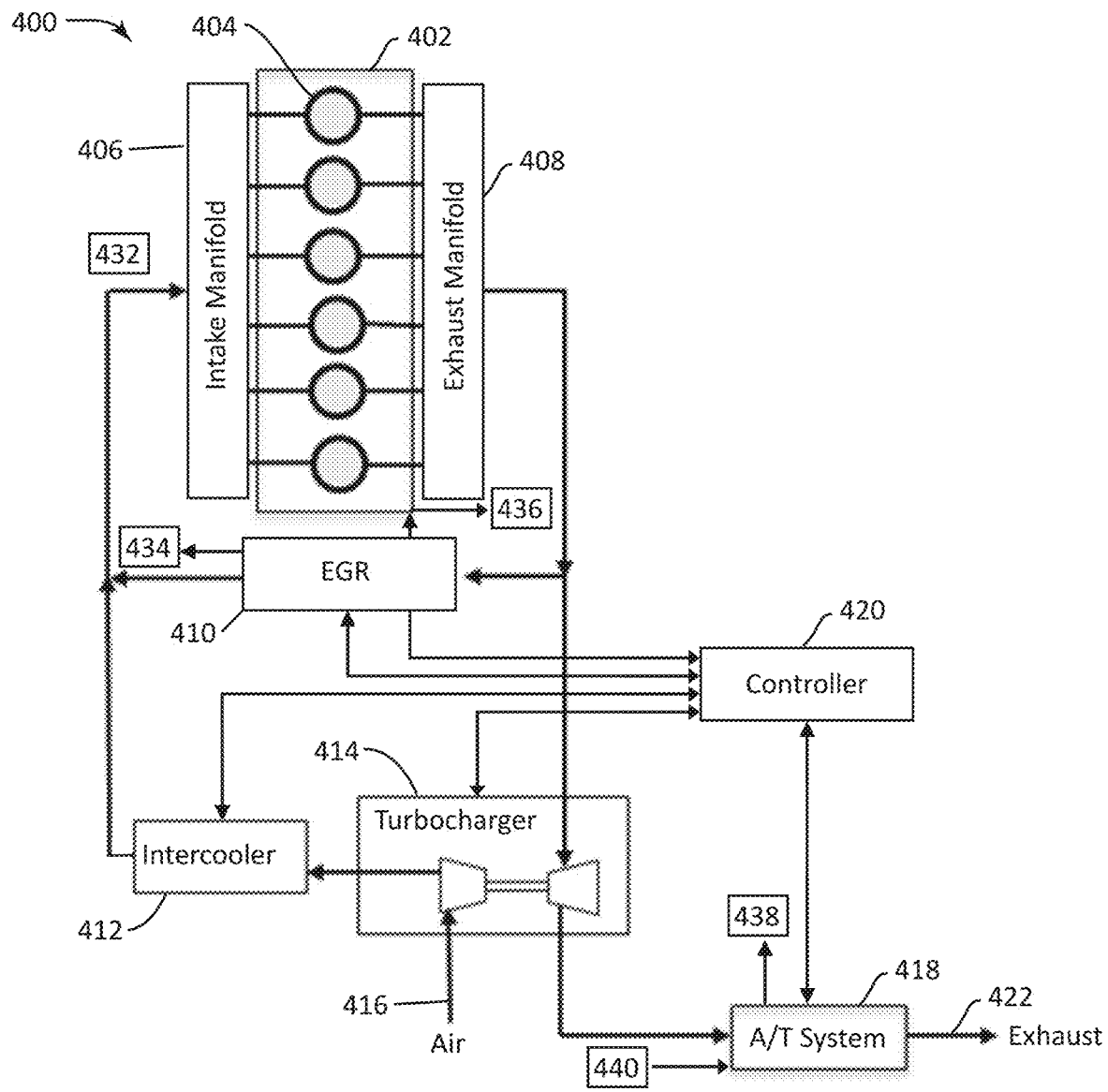
FIG. 9 is a schematic diagram of an exhaust flow system for optimizing exhaust flow rate and temperature in accordance with the optimization process detailed in FIG. 8.

FIG. 8 shows a schematic flow diagram of a representative process 300 for optimizing exhaust flow rate and temperature during warm-up and keep-warm periods. FIG. 9 is a schematic diagram of an exhaust flow system 400 for optimizing exhaust flow rate and temperature in accordance with the optimization process 300 detailed in FIG. 8. In some embodiments, a controller 420 is coupled to the engine 402 and is configured to send commands to and/or receive data from or relating to one or more components of the vehicle or exhaust system, including but not limited to an exhaust gas recirculation (EGR) system 410, intercooler system 412, turbocharger system 414, aftertreatment system (A/T) system 418, and sub-components (e.g. catalytic converters, intake manifold 406, exhaust manifold 408) and sensors integrated within or coupled thereto. Engine 402 is shown as a 6 cylinder 404 engine in FIG. 9. However, other engine configurations are contemplated. Furthermore, aftertreatment system (A/T) system 418 and the system 400 of FIG. 9 may comprise the configurations or components as detailed in the exhaust system 103a of FIG. 1A, the exhaust system 103b of FIG. 1B, or variations thereof.

In one embodiment, controller 420 comprises a processor, memory and storage for executing application software code for implementing the method 300 of FIG. 8. Controller 420 may comprise or include controller 200 shown in FIG. 3 for controlling skip fire operation of the engine. Generally, the present description contemplates a wide variety of control methods and modules for performing the operations described herein, and is not limited to what is expressly shown in the figures. For example, algorithms and associated code/software for executing the optimization framework or method 300 of the present description may be implemented in any of the controllers of the engine 402 (e.g. ECU) or other control units or associated processing modules and/or logic. Furthermore, algorithms and or processing steps embodied in the process 300 may be handled in a separate algorithms and/or controllers. Data received by (e.g. sensor data) or output from (e.g. control data) controller 420 may be directed to or processed by one or more intermediary controllers or components. For example, data sent to or received from the aftertreatment system (A/T) 418 may be conditioned by after treatment monitor 202 shown in FIG. 3.

Exemplary data received by controller 420 for performing the exhaust optimization process 300 of FIG. 8 include, but are not limited to, data in the form of data 432 at or relating to the intake manifold (e.g. charge temperature $T_{chg}$, charge pressure $T_{chg}$, charge flow rate $M_{chg}$, etc.), data 434 at or related to the EGR system 410 (e.g. $M_{egr}$), data 436 at or related to the engine 402 (e.g. engine speed ($\omega_{eng}$), firing density, etc.), data 438 at or related to the aftertreatment system (A/T) 418, and in particular exhaust characteristics 440 prior to the aftertreatment system (A/T) 418 (e.g. exhaust temperature $T_{exh}$, exhaust flow rate $M_{exh}$, etc.) or exhaust characteristics 438 at the aftertreatment system (A/T) 418 (e.g. catalyst temperature $T_{cat}$). Additional data may be acquired from other locations/components, such as data relating to driver input (e.g. torque request), tailpipe exhaust 422, fresh air intake 416 or other location of turbocharger system 414, the intercooler 412, etc.

Data 432, 434, 436, 438, 440, or other data input to controller 420 may comprise data generated from sensors (e.g. temperature, pressure, flow rate, chemical composition, etc.), or otherwise derived from lookup tables, simulation routines, or extrapolation/interpolation or other calculations.

Referring to FIG. 8, optimization method or process 300 first makes an assessment of the operating conditions of the exhaust system, e.g. it identifies whether the exhaust system is in a warm-up or keep-warm period. This is achieved via acquisition/measurement of input exhaust system data (e.g. exhaust temperature $T_{exh}$, catalyst temperature $T_{cat}$) at step 302 and an evaluation of the input exhaust system data at step 304. In one embodiment, step 304 involves making a determination of the following conditions indicating whether warm-up or keep-warm conditions are present: 1) catalyst temperature above a predetermined value, e.g. $T_{cat}>200°$ C.; and the difference between the catalyst temperature and exhaust temperature being above/below a threshold value $T_{thrsh}$, e.g. $|T_{exh}-T_{cat}|<T_{thrsh}$. If yes (i.e., $T_{cat}>200°$ C. and $|T_{exh}-T_{cat}|<T_{thrsh}$ the process at step 306 keeps acquiring/measuring data and returns to step 302. If no, (i.e., $T_{cat}<200°$ C. or $|T_{exh}-T_{cat}|>T_{thrsh}$), the process at step 308 proceeds to make calculations to either maximize or minimize heat flux at steps 314 or 310, respectively. It is appreciated that the value of 200° C. is used in steps 304 and 314 to define the cold start period, however, it should be treated as only representative value and in practice it may be larger or smaller. Alternatively or additionally, other parameters may be used"

Heat flux, which is the heat transferred per unit area per unit time, may be calculated using Eq. 1:

$$\text{Heat Flux} = m_{exh} C_p (T_{exh} - T_{cat}) \quad \text{Eq. 1}$$

where $m_{exh}$ is exhaust flow rate, Cp is specific heat of exhaust gas, $T_{exh}$ is exhaust gas temperature, and $T_{cat}$ is the exhaust aftertreatment catalyst bed temperature. In one embodiment, $T_{cat}$ is measured via a sensor 115 at the reducing catalytic converter 113. However, it is appreciated that the catalyst temperature $T_{cat}$ may be acquired from other locations within the aftertreatment system 418 or derived from lookup tables, modeling, or other calculation routines.

When $T_{exh}>T_{cat}$ (step 314) and T<200° C., heat transfers from the exhaust gas to the catalyst to warm-up the exhaust aftertreatment system. The goal while in this operating condition is to increase catalyst temperature as quickly as possible. Thus for fast warm-up during cold start, Eq. 1 is applied to maximize heat flux. When $T_{exh}<T_{cat}$, heat dissipates from catalyst to exhaust gas, causing the exhaust aftertreatment system to cool down. As this may be undesirable particularly for optimal aftertreatment conditions, Eq. 1 is applied to slow the amount of heat dissipated by minimizing heat flux.

Thus, heat flux can be optimized (e.g. maximize or minimize $m_{exh} * T_{exh}$) by controlling $m_{exh}$ and $T_{exh}$, since $C_p$ is constant. With respect to controlling $m_{exh}$, Eq. 2 may be applied:

$$m_{exh} = m_{chg} - m_{egr} \quad \text{Eq. 2}$$

where $m_{egr}$ is the EGR gas flow rate, and $m_{chg}$ is the charge flow rate.

$m_{chg}$ can be estimated by via the following speed-density Eq. 3:

$$\dot{m}_{chg} = \frac{\eta_{volumetric} \omega_{eng} \rho \text{ Displacement}}{60 \times 2} = \frac{\eta_{volumetric} \omega_{eng} \text{ Displacement}}{60 \times 2} \frac{1000 P_{chg}}{R(273 + T_{Chrg})} \quad \text{Eq. 3}$$

where, $\omega_{eng}$ is the engine speed, r is gas density of charge flow, $h_{volumetric}$ is the engine volumetric efficiency, $P_{chg}$ is charge pressure at the intake manifold, $T_{chg}$ is charge temperature at intake manifold, R is the ideal gas constant, and Displacement=Engine Displacement×Firing density (firing fraction FF).

Combining Eq. 2 and Eq. 3, we get Eq. 4:

$$m_{exh} \cdot = \frac{\eta_{volumetric} \omega_{eng} \text{ Displacement}}{60 \times 2} \frac{1000 P_{chg}}{R(273 + T_{Chrg})} - m_{egr} \quad \text{Eq. 4}$$

Accordingly, calculations from maximizing heat flux in step 314 may be performed with input from data 432, 434, 436, 438, 440, or other data input to controller 420 to increase charge flow by sending commands (step 316) to one or more of the engine or exhaust system components to affect one or more of: increasing the firing fraction FF, increasing boost pressure $P_{chg}$, elevating idle speed $\omega_{eng}$, reducing EGR flow $m_{egr}$, or decreasing charge temperature ($T_{chg}$) via EGR 410 cooler and/or intercooler 412, etc. For example, in one embodiment, the firing fraction FF is increased to increase engine displacement, thereby increasing the charge flow. In some embodiments, one or more arbitration routines or logic may be implemented in step 314 (or step 310) along with the input data to determine if one or more of the above options are implemented. For example, if the torque request is such that the FF is desired to decrease during the warm-up period, other options may be selected (e.g. increasing boost pressure $P_{chg}$, elevating idle speed $\omega_{eng}$, reducing EGR flow $m_{egr}$, etc.).

Alternatively or in conjunction with increasing charge flow, calculations from maximizing heat flux step 314 may be performed with input data to controller 420 to increase charge flow by sending commands (step 316) to the engine or one or more components affecting an increase in exhaust temperature via thermal management techniques (additional fuel if needed), which may include controlling timing of engine 402 valves to delay start of main injection (e.g. delivery fuel late in the cycle as detailed above) and/or adding one or more post injections.

Furthermore, calculations from minimizing heat flux step in 310 may be performed with input from data 432, 434, 436, 438, 440, or other data input to controller 420 to decrease charge flow by sending commands (step 312) to one or more of the engine or exhaust system components to affect one or more of: decreasing the firing fraction FF, lowering boost pressure $P_{chg}$, decreasing idle speed $\omega_{eng}$, increasing EGR flow $m_{egr}$, or increasing charge temperature ($T_{chg}$) via EGR 410 cooler and/or intercooler 412, etc. For example, in one embodiment, the firing fraction FF is decreased to decrease engine displacement, thereby decreasing the charge flow.

It is appreciated that the terms "maximize" and "minimize" with respect to manipulation of the heat flux within the exhaust or aftertreatment system refer to an ideal rate/heat flux for heating or minimizing heat dissipation to/from the catalyst with practical considerations to other operating inputs with respect to the engine, such as fuel efficiency, torque demand, etc. For example, while all of the steps of decreasing the firing fraction FF, lowering boost pressure $P_{chg}$, decreasing idle speed $\omega_{eng}$, increasing EGR flow $m_{egr}$, and increasing charge temperature ($T_{chg}$) could be implemented to produce a minimum heat flux dissipation, such implementation would not be practical in many situations. Accordingly, arbitration routines implemented in steps 310 or 314 are used to determine which of the possible operating commands to use (e.g. change in FF vs. change in boost pressure $P_{chg}$), as well or in combination with the degree or magnitude of the change (e.g. how much the firing density is changed). Furthermore, the manipulation of heat flux may be dynamic or adaptive, such that the rate may decrease as it nears the condition $T_{exh}=T_{cat}$ or be highest when $T_{exh}>>T_{cat}$.

After commands are sent to the engine and/or appropriate components in steps 316 and 312, the process repeats at step 302 to further assess whether the operating conditions of the exhaust system have been met.

The technology of the present description has been described primarily in the context of controlling the firing of 4-stroke, compression ignition, piston engines suitable for use in motor vehicles. The compression ignition may use a stratified fuel charge, a homogeneous fuel charge, partial homogeneous charge, or some other type of fuel charge. However, it should be appreciated that the described skip fire approaches are very well suited for use in a wide variety of internal combustion engines. These include engines for virtually any type of vehicle–including cars, trucks, boats, construction equipment, aircraft, motorcycles, scooters, etc.; and virtually any other application that involves the firing of working chambers and utilizes an internal combustion engine.

In some preferred embodiments, the firing timing determination module utilizes sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters or a library of predetermined firing sequences may be used.

In other embodiments of the description, intake and exhaust valve control may be more complex than simple binary control, i.e. open or closed. Variable lift valves may be used and/or the valve opening/closing timing may be adjusted by a cam phaser. These actuators allow limited control of cylinder MAC without use of a throttle and its associated pumping losses. Advantageously adjustment of the cylinder MAC allows control of the fuel/air stoichiometry for a fixed fuel charge. The combustion conditions may then be optimized for improved fuel efficiency or to provide desired conditions, i.e. oxygen level, temperature, etc., in the combustion exhaust gases.

Although only a few embodiments of the description have been described in detail, it should be appreciated that the description may be implemented in many other forms without departing from the spirit or scope of the description. For example, the drawings and the embodiments sometimes describe specific arrangements, operational steps, and control mechanisms. It should be appreciated that these mechanisms and steps may be modified as appropriate to suit the needs of different applications. For example, the order of the various aftertreatment emission control elements in the exhaust path shown in FIGS. 1A and 1B may be altered. Additional aftertreatment devices may be use and the functionality of individual elements combined into a single element. The methods of performing the oxidization and reduction steps may be altered; for example, a lean $NO_x$ trap may be used in place of the SCR catalyst. Using a $NO_x$ adsorber/$NO_x$ trap for a lean burn engine requires the engine to run slightly rich periodically, such as every minute or two, to purge the $NO_x$ from the adsorber, regenerating the $NO_x$ trap. Since compression ignition engines typically operate under very lean conditions, especially at light loads, to operate the engine under rich condition to purge the $NO_x$ trap requires a significant reduction in air flow through the engine, which normally requires throttling the engine air flow. The regeneration process is also a very fuel consuming. It would be very advantageous to use skip fire control to purge a $NO_x$ trap compared to traditional methods of purging $NO_x$ traps. Use of skip fire control may obviate the requirement to have a throttle in the engine, reducing engine cost and complexity. In other embodiments, use of skip fire control may be used in concert with an engine throttle to control exhaust gas temperature.

Additionally, while the description has been generally described in terms of a compression ignition engine, it may also be used in spark ignition, spark ignition assisted, or glow plug ignition assisted engines. In particular, the description is applicable to lean burn spark ignition engines. These engines have some of the attributes of compression ignition engines, such as oxygen in the exhaust stream, so they cannot generally use a conventional 3-way catalyst based aftertreatment system. In some embodiments not all of the cylinders in an engine need be capable of deactivation. This may reduce costs relative to an engine having all cylinders capable of deactivation. In some embodiments, one or more of the described operations are reordered, replaced, modified or removed. Therefore, the present embodiments should be considered illustrative and not restrictive and the description is not to be limited to the details given herein.

What is claimed is:

1. A controller for operating a lean burn internal combustion engine having an exhaust system coupled to the lean burn internal combustion engine, the controller configured for, during operation in a lean burn operational mode:
   receiving data relating to an operating condition of one or more of the exhaust system and the engine while the engine is operating at an operational firing fraction;
   identifying a warm-up condition based on the received data;
   increasing an exhaust flow rate of the exhaust system when the warm-up condition is identified;
   identifying a keep-warm condition based on the received data; and
   decreasing an exhaust flow rate of the exhaust system when the keep-warm condition is identified.

2. The controller as recited in claim 1, wherein the received data comprises a catalyst temperature within an aftertreatment system of the exhaust system and an exhaust temperature of exhaust upstream from the aftertreatment system.

3. The controller as recited in claim 2, wherein at least one of identifying the warm-up condition and identifying the keep-warm condition comprises calculating a difference between the catalyst temperature Tcat and the exhaust temperature Texh and comparing the difference against a threshold.

4. The controller as recited in claim 1, wherein at least one of the increasing the charge flow and the decreasing the charge flow further comprises modifying a boost pressure to the engine.

5. The controller as recited in claim 1, wherein at least one of the increasing the charge flow and the decreasing the charge flow comprises modifying an exhaust gas recirculation (EGR) flow of the exhaust system.

6. The controller as recited in claim 1, the controller further configured for:
   increasing an exhaust flow temperature of the exhaust system when the warm-up condition is identified.

7. The controller as recited in claim 1 wherein increasing the exhaust flow rate when the warm-up condition is identified is accomplished at least in part by increasing the operational firing fraction of the engine, and decreasing the exhaust flow rate when the keep-warm condition is identified is accomplished at least in part by decreasing the operational firing fraction.

8. A method for operating a lean burn internal combustion engine having an exhaust system coupled to the lean burn internal combustion engine, the method comprising, during operation in a lean-burn operational mode:

receiving data relating to an operating condition of one or more of the exhaust system and the engine while the engine is operating at an operational firing fraction;

identifying a warm-up condition based on the received data;

increasing an exhaust flow rate of the exhaust system when the warm-up condition is identified;

identifying a keep-warm condition based on the received data; and decreasing an exhaust flow rate of the exhaust system when the keep-warm condition is identified.

9. The method as recited in claim 8, wherein the received data comprises a catalyst temperature within an aftertreatment system of the exhaust system and exhaust temperature of exhaust upstream from the aftertreatment system.

10. The method as recited in claim 9, wherein at least one of identifying the warm-up condition and identifying the keep-warm condition comprises calculating a difference between the catalyst temperature and the exhaust temperature and comparing the difference against a threshold.

11. The method as recited in claim 8, wherein at least one of the increasing the charge flow and the decreasing the charge flow further comprises modifying a boost pressure to the engine.

12. The method as recited in claim 8, wherein at least one of the increasing the charge flow and the decreasing the charge flow further comprises modifying an exhaust gas recirculation (EGR) flow of the exhaust system.

13. The method as recited in claim 8, the method further configured for:

increasing an exhaust flow temperature of the exhaust system when the warm-up condition is identified.

14. The method as recited in claim 8 wherein increasing the exhaust flow rate when the warm-up condition is identified is accomplished at least in part by increasing the operational firing fraction of the engine, and decreasing the exhaust flow rate when the keep-warm condition is identified is accomplished at least in part by decreasing the operational firing fraction.

15. A controller for operating a lean burn internal combustion engine including an exhaust system coupled to the lean burn internal combustion engine, the controller configured for:

receiving data relating to an operating condition of one or more of the exhaust system and the engine;

identifying a warm-up condition based on the received data; and when warm-up condition is identified, selecting an operational firing fraction that facilitates warming up an aftertreatment system in the exhaust system, wherein the selected operational firing fraction is less than one, and is higher than a second firing fraction what would otherwise have been used had the warm-up condition not been identified, to thereby provide a higher exhaust flow rate than would have been provided by the use of the second firing fraction.

* * * * *